United States Patent [19]

Succari et al.

[11] Patent Number: 4,931,637

[45] Date of Patent: Jun. 5, 1990

[54] SCANNER UTILIZING A PARTICULAR LIGHT GUIDE

[75] Inventors: Shmuel Succari, Raanana; Shalev Gilad, Hod HaSharon; Michael Nagler, Tel Aviv; Avigdor Beiber, Raanana; Dov Berman, Hofit, all of Israel

[73] Assignee: Scitex Corporation Ltd., Herzlia Bet, Israel

[21] Appl. No.: 396,805

[22] Filed: Aug. 21, 1989

Related U.S. Application Data

[63] Continuation of Ser. No. 103,218, Oct. 1, 1987, abandoned.

[30] Foreign Application Priority Data

Oct. 7, 1986 [IL] Israel .................................... 80242

[51] Int. Cl.$^5$ ..................... G02B 26/10; H04N 1/10
[52] U.S. Cl. ............................. 250/235; 250/227.26; 358/484
[58] Field of Search ................. 250/234–236, 250/227; 350/6.5–6.91; 358/484, 496

[56] References Cited

U.S. PATENT DOCUMENTS

| | | | |
|---|---|---|---|
| 4,568,984 | 2/1986 | Juergensen et al. | 250/236 |
| 4,602,154 | 7/1986 | Taniguchi | 250/235 |
| 4,617,470 | 10/1986 | Horikawa | 358/293 |

OTHER PUBLICATIONS

Laser Recording Performance with Spatial Error Compensation, S. Bousky and L. Teeple, SPIE, vol. 53, 1973, (pp. 133–139).

Beam Deflection at High Accuracy and Precision, D. P. Jablonowski and J. Raamot, SPIE, vol. 84, 1976.
Ultrahigh Resolution Data Terminal, M. R. Smith, R. H. Burns, and R. C. Tsai, SPIE, vol. 200, 1979, (pp. 171–178).
Bestenheimer et al., Journal of Appl. Photo. Eng., vol. 2, 1976, (pp. 86–92).

*Primary Examiner*—Edward P. Westin
*Attorney, Agent, or Firm*—Finnegan, Henderson, Farabow, Garrett & Dunner

[57] ABSTRACT

A laser beam scanner comprising a laser source, apparatus for producing a scanning beam and a reference beam which are generally parallel, apparatus for directing the scanning beam onto a surface to be scanned, and apparatus for determining the position of the scanning beam in real time in two dimensions by sensing the position of the reference beam, and wherein the apparatus for sensing the position of the reference beam comprises a grating disposed along a scan axis and defining a multiplicity of first grating lines along the scan axis, which permit the definition of the position of the reference beam in a first dimension, a second grating line disposed across the multiplicity of first grating lines and first and second sensors disposed at respective sides of the second grating line, for sensing the relative amount of light impinging above and below the second grating line, for permitting the definition of the reference beam in a second dimension, whereby the position of the reference beam may be determined both along the scan axis and perpendicular thereto at every location along the scan axis.

10 Claims, 8 Drawing Sheets

(FRONT VIEW)

SCANNER UTILIZING A PARTICULAR LIGHT GUIDE

This application is a continuation of application Ser. No. 07/103,218, filed Oct. 1, 1987, now abandoned.

FIELD OF THE INVENTION

The present invention relates to laser beam scanning apparatus generally, to laser beam sensing apparatus generally and more particularly to such sensing apparatus which is useful in a laser plotter or scanner.

BACKGROUND OF THE INVENTION

There exist various techniques for measuring and accurately positioning laser beams. The following early publications represent the general state of the prior art:

"Laser Recording Performance With Spatial Error Compensation", S. Bousky and L. Teeple, *SPIE*, Vol 53, 1973. In this paper, a polygon deflector is employed together with a reference line for determining cross scan error. Two-dimensional corrections are made to the beam position, which is measured differentially.

"Beam Deflection at High Accuracy and Precision", D. P. Jablonowski and J. Raamot, *SPIE*, Vol 84, 1976. This paper describes X-Y deflection using galvanometer-driven mirrors or polygons, using crossed gratings to measure two-dimensional position information. A reference beam is deflected to measure position and is used to measure the beam position in two dimensions during writing.

"Ultrahigh Resolution Data Terminal", M. R. Smith, R. H. Burns and R. C. Tsai, *SPIE*, Vol. 200, 1979. This paper describes a high resolution display that uses a laser to address a liquid crystal gate. Deflection is performed by a galvanometer-driven mirror. A referece beam hits a crossed Ronchi grating and the resulting information is used to instantaneously determine the two-dimensional coordinates of the beam.

One of the main problems encountered in high-quality laser beam scanning relates to accurate positioning of a laser generated dot relative to adjacent dots, as noted in the literature (e.g. Bestenheimer et al. in Journal of Appl. Phot. Eng. vol. 2, 1976). The human eye has extreme sensitivity to periodic errors in the interline separation of beams. Periodic errors resulting from intensity changes, or positional fluctuations, can lead to banding of high visibility. Passive and active methods have been used to minimize these errors.

One of the applications of laser beam scanners is readout of information from previously recorded data. Since the illuminating laser beam is usually extremely directional, light must be reflected from as wide an angle as possible, to minimize speckle noise, increase signal-to-noise ratio and eliminate visibility of cut-lines in graphic arts paste-ups. It is a purpose of this invention to offer solutions to these two problems.

SUMMARY OF THE INVENTION

The present invention seeks to provide laser beam scanning apparatus having enhanced performance as compared with conventional laser beam scanners.

There is thus provided in accordance with a preferred embodiment of the present invention a laser beam scanner comprising a laser source, apparatus for producing a scanning beam and a reference beam which are generally parallel, apparatus for directing the scanning beam onto a surface to be scanned, and apparatus for determining the position of the scanning beam in real time in two dimensions by sensing the position of the reference beam, and wherein the apparatus for sensing the position of the reference beam comprises a grating disposed along a scan axis and defining a multiplicity of first grating lines along the scan axis, which permit the definition of the position of the reference beam in a first dimension, a second grating line disposed across the multiplicity of first grating lines and first and second sensors disposed at respective sides of the second grating line, for sensing the relative amount of light impinging above and below the second grating line, for permitting the definition of the reference beam in a second dimension, whereby the position of the reference beam may be determined both along the scan axis and perpendicular thereto at every location along the scan axis.

Additionally in accordance with a preferred embodiment of the present invention there is provided apparatus for determining the position of a laser beam in real time in two dimensions comprising a grating disposed along a scan axis and defining a multiplicity of first grating lines along the scan axis, which permit the definition of the position of the beam in a first dimension, a second grating line disposed across the multiplicity of first grating lines and first and second sensors disposed at respective sides of the second grating line for sensing the relative amount of light impinging above and below the second grating line, for permitting the definition of the beam in a second dimension, whereby the position of the beam may be determined both along the scan axis and perpendicular thereto at every location along the scan axis.

Additionally in accordance with a preferred embodiment of the present invention there is provided a laser beam scanner comprising a laser source, apparatus for producing a scanning beam, apparatus for directing the scanning beam onto a surface to be scanned at a scan line, and apparatus for receiving light reflected from the surface to be scanned and comprising a light guide, arranged in light receiving relationship with the surface to be scanned alongside the scan line at one side thereof, and a cylindrical mirror arranged in light receiving relationship with the surface to be scanned alongside the scan line at an opposite side thereof, for reflecting light received from the surface into the light guide.

Further in accordance with an embodiment of the invention there is provided apparatus for receiving light reflected from the surface to be scanned and comprising a light guide arranged in light receiving relationship with the surface to be scanned alongside the scan line at one side thereof and a cylindrical mirror arranged in light receiving relationship with the surface to be scanned alongside the scan line at an opposite side thereof for reflecting light received from the surface into the light guide.

Additionally in accordance with an embodiment of the present invention the light guide comprises an elongate portion which is arranged parallel to the scan line, and a light pipe which causes light passing along the light guide to pass axially therethrough so as to exit the light guide adjacent axial ends thereof. Photodetectors are provided adjacent the axial ends of the light guide for receiving the light passing through the light guide.

Further in accordance with an embodiment of the present invention, there is provided light receiving apparatus for receiving light reflected from an object along a scan line and comprising a light guide including an elongate portion which is arranged parallel to the scan line and a light pipe which causes light passing along the light guide to pass axially therethrough so as to exit the light guide adjacent axial ends thereof, and photodetectors disposed adjacent the axial ends of the light guide for receiving the light passing through the light guide.

Additionally the light guide can be made of fluorescing materials such that light collected at the laser wavelength is converted to a different wavelength as to maximise the energy collected at the photosensors.

BRIEF DESCRIPTION OF THE DRAWINGS

The present invention will be understood and appreciated more fully from the following detailed description, taken in conjunction with the drawings in which.

DETAILED DESCRIPTION OF A PREFERRED EMBODIMENT

Figure 1A:
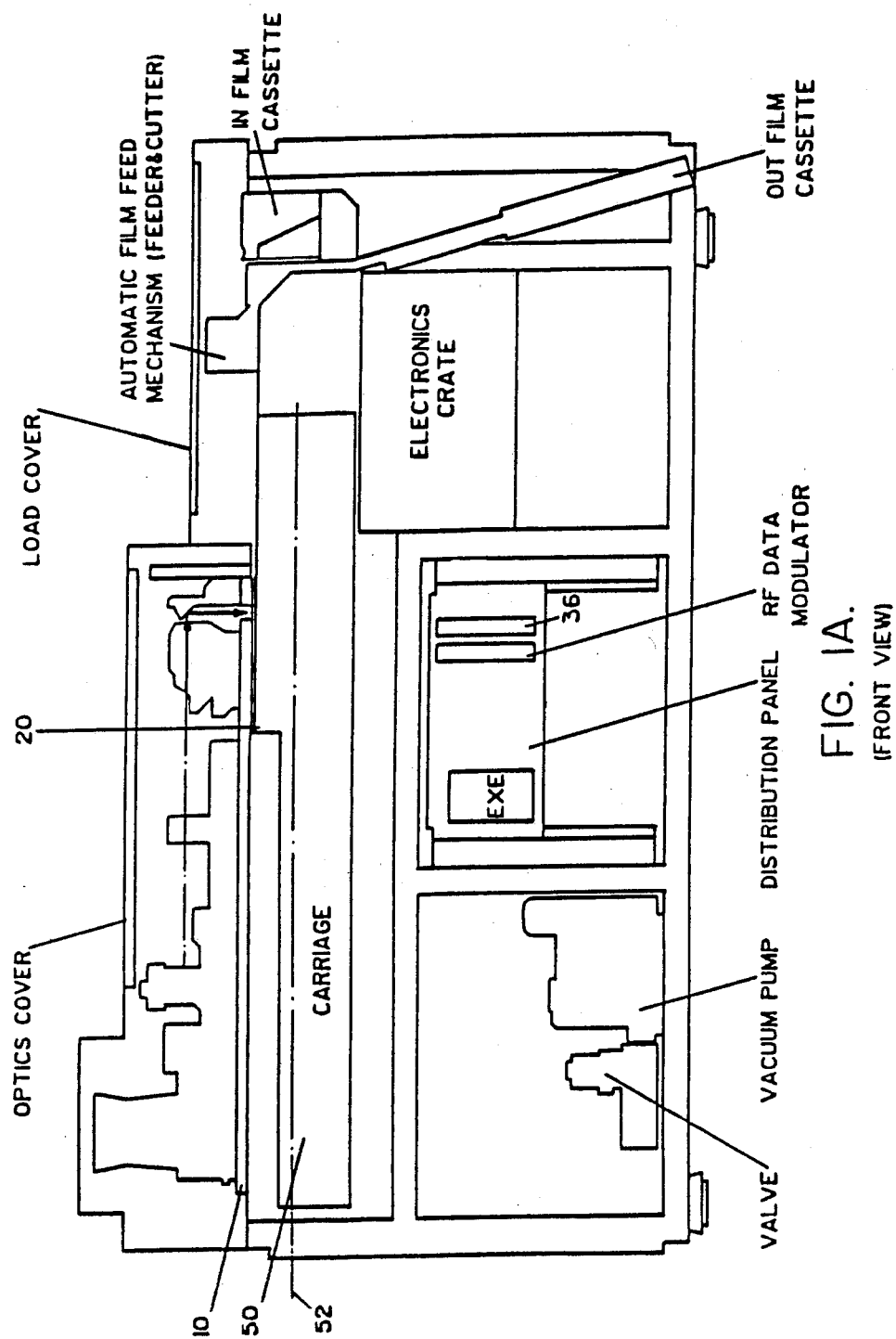
FIG. 1A is a diagrammatic illustration of scanner apparatus constructed and operative in accordance with a preferred embodiment of the present invention.
Figure 1B:
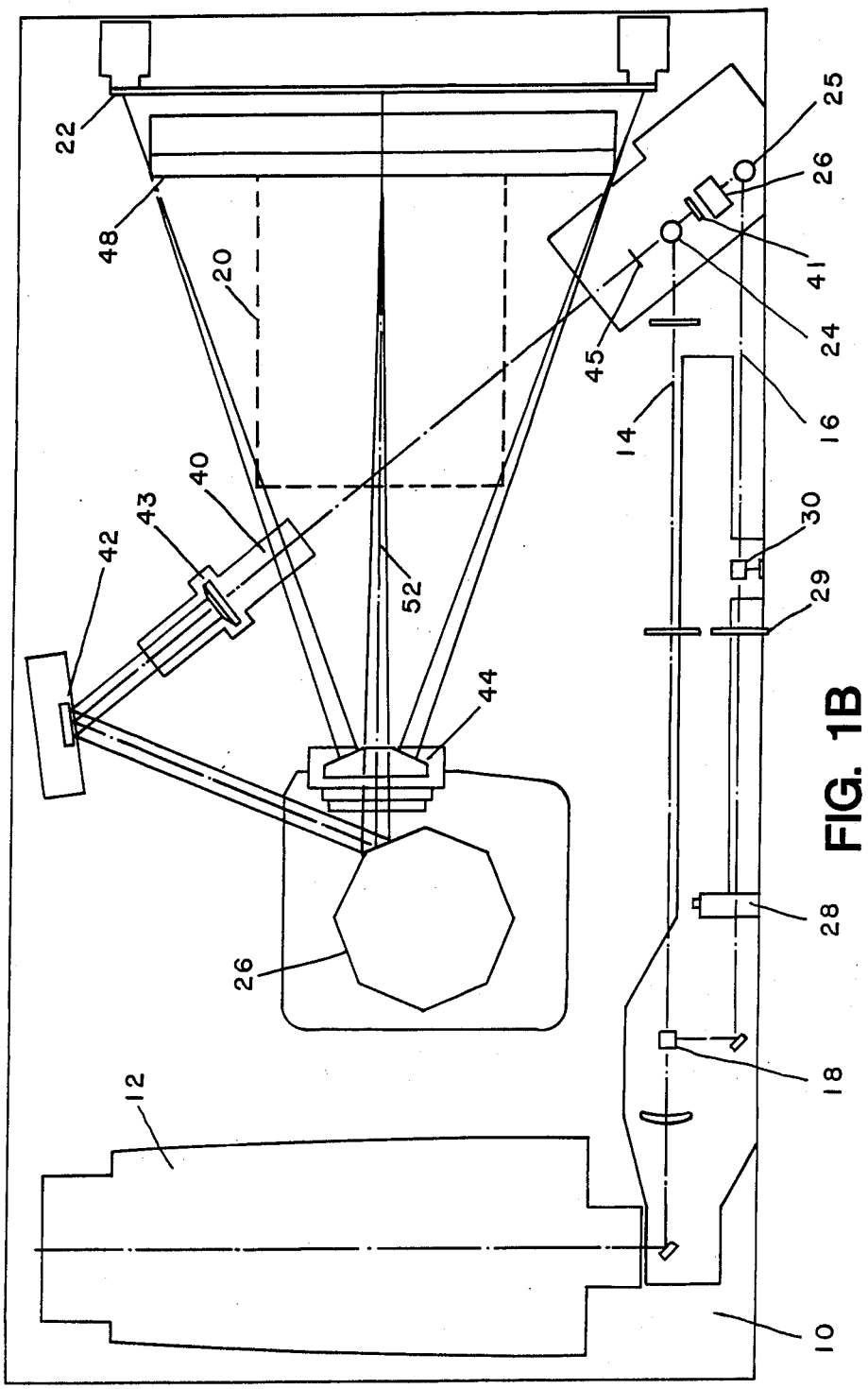
FIG. 1B is a general optical diagram of the scanner apparatus of FIG. 1A.

Reference is now made to FIGS. 1A and 1B, which together constitute a diagrammatic illustration of scanner apparatus constructed and operative in accordance with a preferred embodiment of the present invention. The scanner apparatus includes optical, electro-optical and acousto-optical components mounted on an optical table 10 and lying in the optical path of the laser beam. The optical components and their position in the optical path of the laser beam are shown in FIG. 1B.

A laser 12 provides an output beam which is first split into a reference beam 14 and an exposure beam 16 by a beam splitter 18. The reference beam is used to track the location of the exposure beam on both the x- and y-axes of a scan line. This is accomplished by maintaining the beams along parallel paths until they reach the film 20. The exposure beam 16 is reflected onto the film while the reference beam 14 is projected onto a Beam Position Detector (BPD) 22.

The reference beam 14 enters an acousto-optic small-angle deflector 24. This deflector constantly adjusts the angle of reflection of the beam from a rotating polygonal mirror 26, thus determining its position on the beam position detector 22. This adjustment is executed by a Voltage Controlled Oscillator VCO 36 (FIG. 1A) according to information supplied by the BPD 22 in a closed feedback loop. After deflection, the paths of the reference and exposure beams are combined to be in near perfect spatial overlap for a substantial portion of the remaining light path.

The exposure beam 16 first enters an acousto-optic modulator 28, which executes data modulation. The exposure beam intensity is then measured by a light-detector assembly 29 by splitting off part of the exposure beam with a beam splitter 30. The output of light-detector assembly 29 provides a feedback system for beam intensity adjustment.

The light-detector assembly 29 also sets the laser intensity prior to actual exposure, to ensure that the reference beam intensity is optimal for operation of the BPD 22 and that the exposure beam intensity suits the exposure resolution and meets film specifications.

The exposure beam 16 then enters an acousto-optic small-angle deflector 25 identical to deflector 24 of the reference beam 14. The deflector adjusts the beam angle in exactly the same manner as deflector 24, being driven by the same VCO signal.

The reference and exposure beams, combined until the latter is reflected onto the film 20, enter a beam expander assembly 40. This assembly comprises two lenses 41 and 43 respectively separated by a pinhole sheet 45. After the beams are expanded, they are reflected by a large mirror 42 onto the rotating mirror 26. The rotating mirror 26 reflects the beams and projects them through an f-theta lens 44.

The f-theta lens extends the focal lengths of the beams toward the extremities of the arc, thus flattening most of the arc into a straight line. The final adjustment at the extreme ends of the line is accomplished electronically by increasing the intensity of the beam. Thus, the f-theta lens 44 ensures sharp focus of the beams on the film 20 and the BPD 22 along the entire scan line and substantially eliminates wide-angle distortion.

From the f-theta lens 44, the reference beam 14 is projected directly onto the BPD 22, while the exposure beam 16 is reflected from a mirror 48 onto the film 20.

A linear scan must be executed along each scan line, where data modulation is synchronized with beam position. The distance between the centers of adjacent points and the point density must also be uniform along the scan line. To accomplish this, the BPD 22 tracks the reference beam 14 along both the x- and y-axes of the film 20 and supplies the positional information to an electro-optical electronic control (E1-Op) subsystem.

Tracking and subsequent beam adjustment along the y-axis ensures a linear scan. The reference beam position on the y-axis is fed into a closed loop that adjusts for variations due to air turbulence and structural limitations. The greatest variation is caused by the rotating mirror 26, since the physical characteristics of each facet differ one from another. Other factors include laser pointing errors, mirror wobble, vibrations, timing errors, and thermal variarions in the system. The closed loop is explained below.

The beam position along the x-axis must be constantly tracked for synchronization of data modulation with the beam position and for the beam intensity adjustments along the scan line, necessary to ensure uniform point density. The beam position on the x-axis is fed into the E1-Op subsystem. The E1-Op subsystem executes data modulation and stores, recalls and applies the intensity values for each point in the scan line.

The position of the reference beam 14 on the BPD 22 corresponds to the position of the exposure beam 16 on the film 20. Thus, tracking the reference beam is necessary and sufficient for locating the exposure beam on the film. In other words, all necessary positional information is supplied by tracking the reference beam. All adjustments of the reference beam position along a scan line are duplicated for the exposure beam. The exposure beam itself is not tracked.

Referring back to FIG. 1A. film 20 is supported on a carriage 50. Carriage 50 is driven along a displacement axis 52 by a drive mechanism which may include a linear DC motor 54 (FIG. 6) such as a motor manufactured by Anorad Corporation of Haupaque, Long Island, NY, USA. In addition to the drive mechanism, a linear encoder 56 (FIG. 6) may be provided to monitor the position of the carriage 50 along axis 52.

Figure 6:
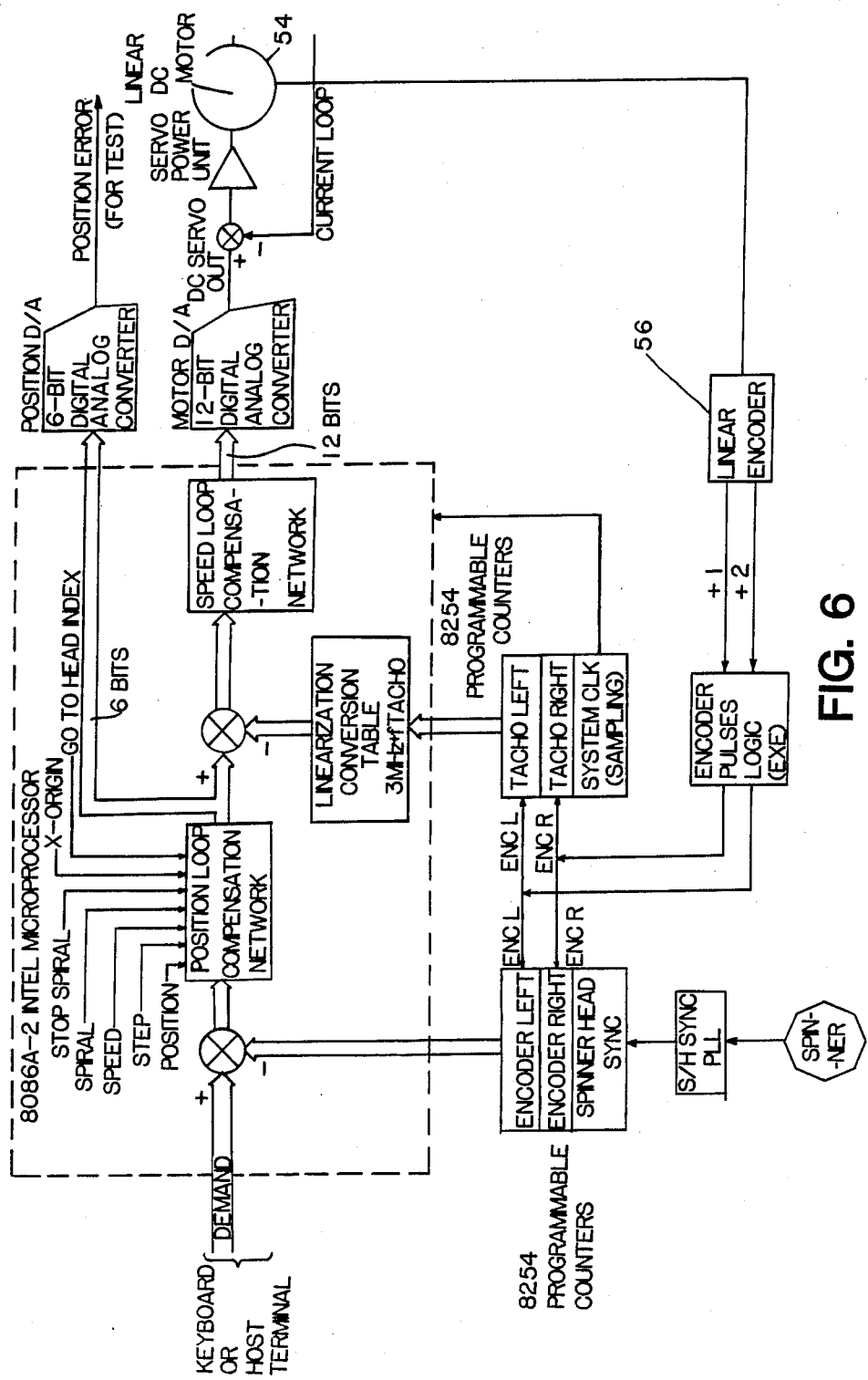
FIG. 6 is a block diagram illustration of velocity and position control loops.

Position and velocity control loops are provided to enable precise repositioning of the carriage 50 in the event that an interruption of data flow occurs. The repositioning is also carried out at precisely the same velocity employed during the initial scan. The provision of both velocity and position control loops ensures that striping will not appear even in the case of intermittent carriage movement. This apparatus is illustrated in FIG. 6.

Figure 2:
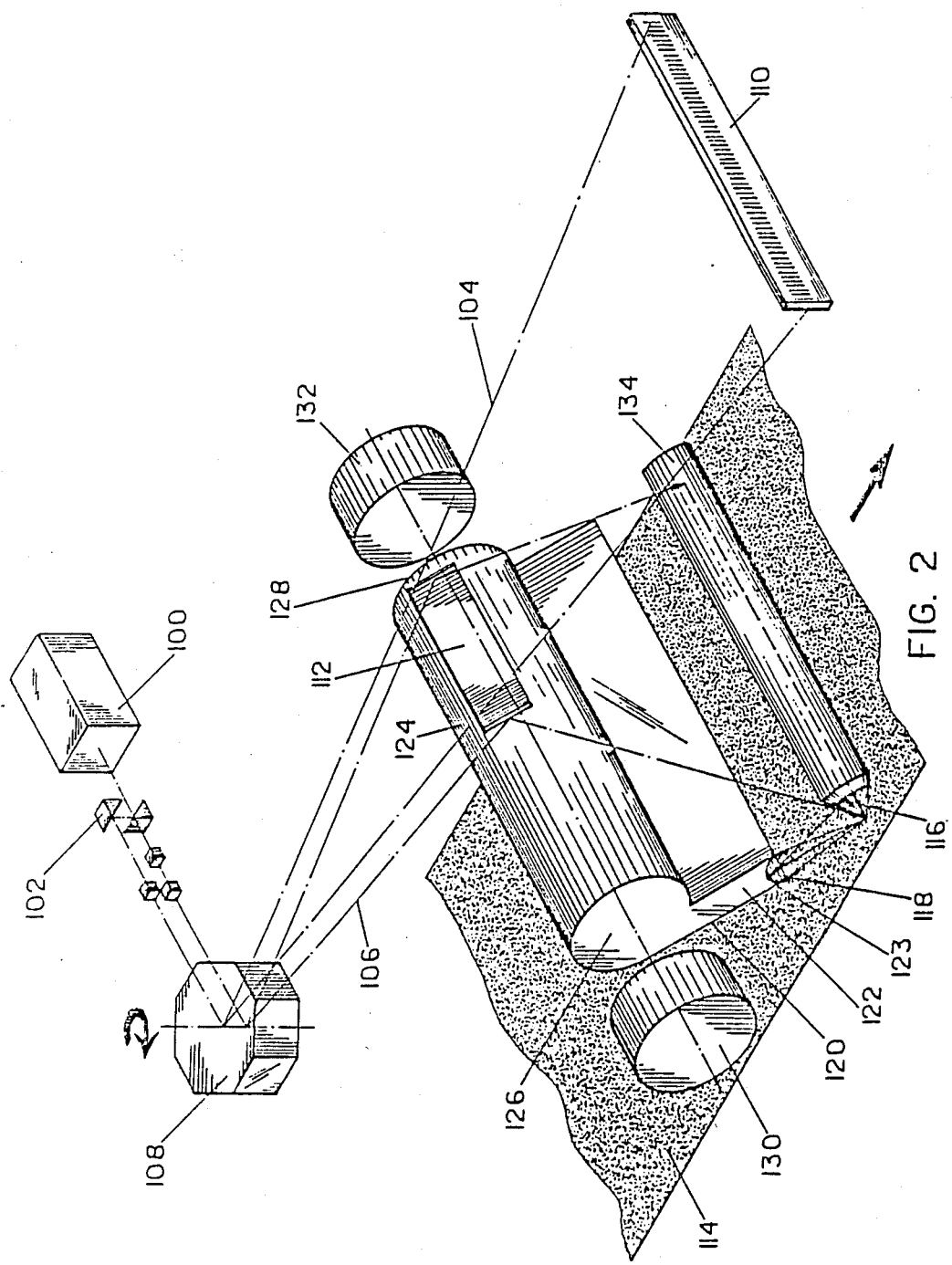
FIG. 2 is a general optical diagram showing the generation and utilization of scanning and reference beams in accordance with a preferred embodiment of the present invention.

Reference is now made to FIG. 2, which illustrates in simplified, optical diagram form, apparatus for generating and utilizing scanning and reference beams. A laser source 100 provides a laser beam which passes through conventional beam-splitting optics 102, producing two parallel laser beams, hereinafter referred to as a reference beam 104 and a scanning beam 106. Both beams impinge on a rotating polygon mirror 108.

The reference beam 104 is reflected onto position measuring apparatus 110, which will be described hereinafter, in detail, with reference to FIGS. 5A and 5B.

Figure 3:
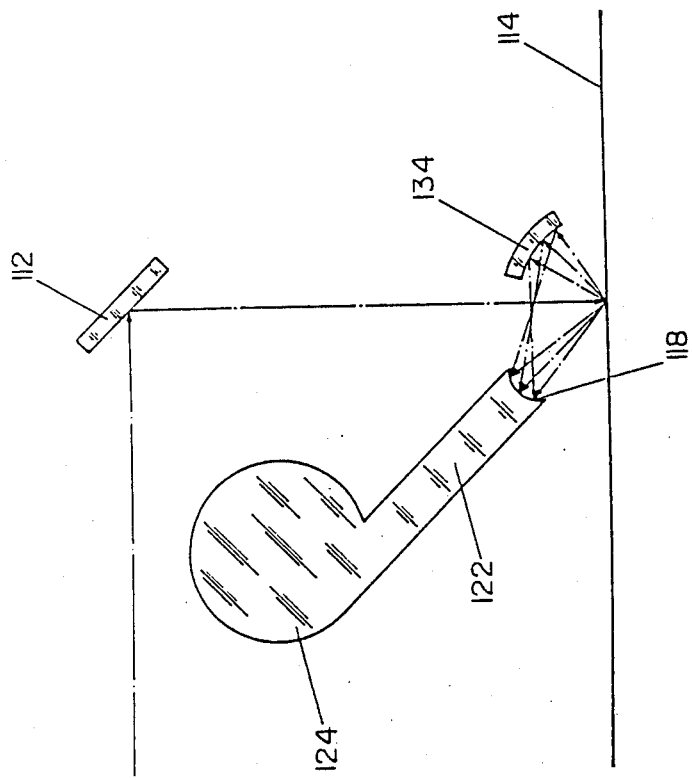
FIG. 3 is a side view illustration of light receiving apparatus forming part of the apparatus shown in FIG. 2.
Figure 4:
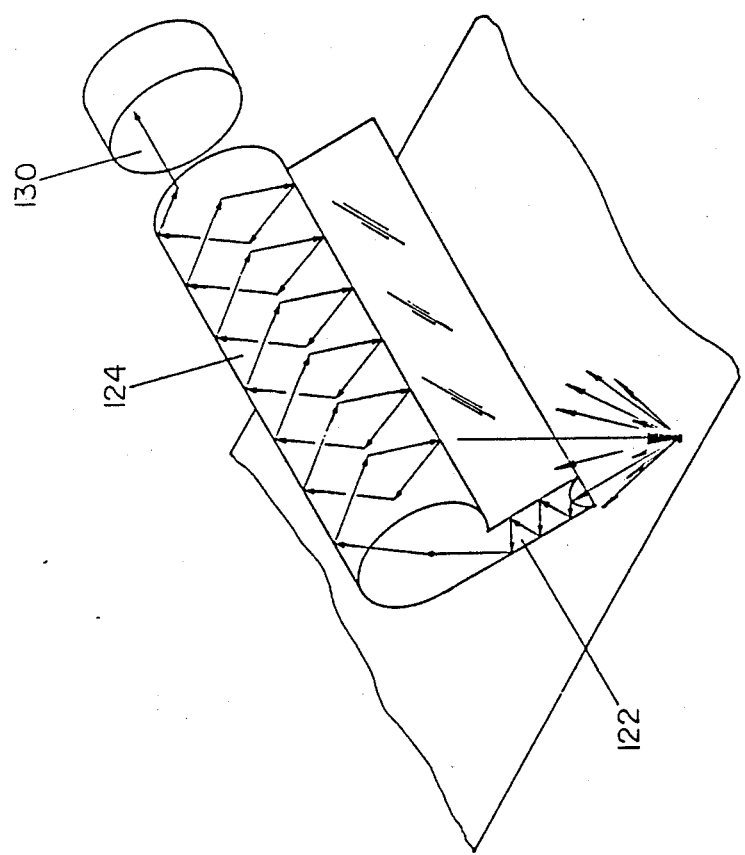
FIG. 4 is a pictorial illustration of part of the light travel path through a light guide forming part of the apparatus shown in FIG. 2.

The scanning beam 106 is intercepted by a long folding mirror 112, which reflects it onto a surface 114 to be scanned, along a well-defined scan line 116, typically of width 0.001 inches. Light reflected from the surface 114 at the scan line 116 is received by a light receiving assembly 118, which is illustrated in more detail in FIGS. 3 and 4, to which reference is also made.

The light receiving assembly 118 comprises a generally elongate light guide 120 which extends along the scan line 116. The light guide 120 comprises a generally planar portion 122 having a concave curved edge 123 facing the scan line 116 and disposed at an angle of approximately 45 degrees from the plane of surface 114 and a distance typically 0.15 inches from the scan line 116. The planar portion 122 terminates in a generally circular cylindrical light pipe 124 having axial butt ends 126 and 128 adjacent to which are disposed in light receiving relationship respective photodetectors 130 and 132, such as Hamamatsu photomultipliers.

The light guide 120 may be formed of a flourescent material such as dye-doped polycarbonate. The choice of the particular dye is made according to the wavelength of the reflecting laser beam so that the absorption at the laser wavelength is maximal while the absorption at the flourescent wavelength is minimal. This ensures that substantially all of the light received is converted to a longer wavelength that is transmitted to the reflector without substantial absorption in the light guide. This ensures higher light collecting efficiency.

It is a particular feature of the present invention that there is also provided a cylindrical mirror 134 on the opposite side of the scan line 116 from light guide 120. Mirror 134 is arranged to reflect light received from the surface 114 at scan line 116 into light guide 120. In this manner high light collection efficiency, speckle noise elimination and cut line signal reduction are provided. The use of two photodetectors and the summation of the resulting signal therefrom provides a substantially uniform signal across the scan line.

The light guide 120 may be integrally formed or alternatively may be formed of separate planar and cylindrical elements suitably bonded together with optical cements.

Figure 5A:
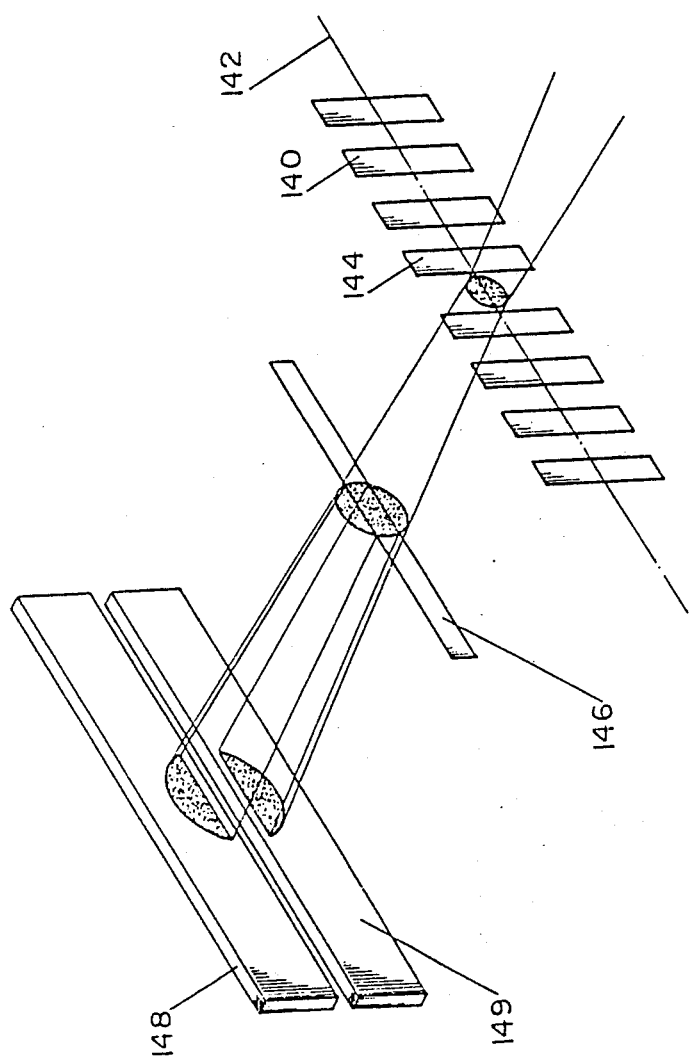
FIGS. 5A and 5B are respective pictorial and side view illustration of position detection apparatus forming part of the apparatus shown in FIG. 2.
Figure 5B:
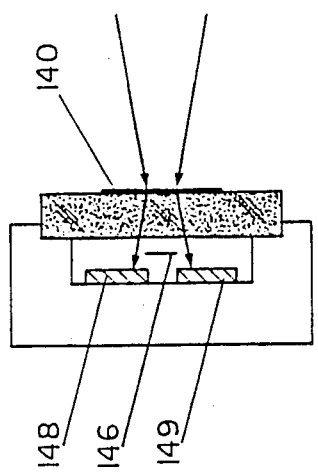

Reference is now made to FIGS. 5A and 5B which illustrate laser beam position detection apparatus constructed and operative in accordance with a preferred embodiment of the present invention. The apparatus comprises a grating 140 arranged along a first reference axis 142 and comprising a plurality of upstanding grating lines 144. Disposed across grating 140 and transverse to grating lines 144 is a transverse grating line 146, which typically bisects grating lines 144. Arranged downstream of grating 140 and grating line 146 are a pair of elongate sensors 148 and 149, such as linear detectors available from United DeLeon Technology inc. of Los Angeles, CA, USA, which are arranged above and below grating line 146 and sense the relative amount of light received above and below the grating.

It will be appreciated that grating 140 in cooperation with sensors 148 and 149 provides an output indication of the position of the beam along axis 142, while the relative amount of light on sensors 148 and 149, considered in a differential mode, provides an output indication at the same time of the position of the beam along an axis perpendicular to axis 142, parallel to the plane of detectors 148 and 149.

It will be appreciated that the output signals from sensors 148 and 149 may be provided to a position correction mechanism that can simultaneously correct the positions of both the scanning and reference beams 106 and 104 respectively.

Reverting now to FIGS. 1A and 1B, it is noted that the closed feedback loop comprises the beam position detector 22, an amplifier circuit (not shown), the beam position VCO 36, and acousto-optic deflectors 24 and 25. The amplifier circuit subtracts the voltage of sensor 148 from sensor 149. The voltage difference can be either positive (i.e. A−B>0) or negative (i.e. A−−B<0). This voltage is normalized to local intensity by dividing by the sum A+B.

The VCO 36 generates an output frequency of 80 MHz in the absence of an applied voltage from the BPD 22 (when the beam is absent at the beginning or end of an exposure row). The output frequency is an RF signal. When the voltage difference is applied to the VCO, the RF frequency changes in proportion to the voltage applied. The direction of the change is determined by the sign (positive or negative) of the voltage.

The same RF frequency from the VCO 36 is applied to both acousto-optic deflectors, 24 and 25. One of the deflectors adjusts the angle of deflection of the exposure beam 16 while the other adjusts the angle of the reference beam 14.

When the laser beams enter the deflectors in the absence of an applied RF frequency, the beams exit the deflectors undisturbed. When an RF signal is applied to the deflectors, the beams are deflected at an angle directly proportional to the frequency of the RF signal.

In the absence of an applied voltage from the BPD 22, the angle of deflection is constant and corresponds to an RF frequency of 80 MHz. The changes in the RF frequency caused by the voltage difference applied to the VCO 36 are proportionately translated into a change in the deflection angle of the beams projected through the deflectors.

The beams from the acousto-optic deflectors 24 and 25 are then reflected off the rotating polygon 108 (FIG. 2) onto the film 20 and the BPD 22, closing the feedback loop. The change in the beam deflection angle from the acousto-optic deflectors causes a corresponding change in the reflection angle of the beams from the mirror 108. This is expressed as a shift in the position of the exposure and reference beams along the y-axis of the film and the BPD, respectively.

In summary, if the reference beam 14 is below the midline on the BPD 22 (i.e. A−B>0), the beams have been moved up on the film 20 and on the BPD 20 in proportion to the deviation. If the reference beam 14 is above the midline (i.e. A−B<0), the beams have been moved down.

The reference beam 14 is tracked along the x-axis of the film 20 by summing the two voltages from the strips (A+B). This sum is proportional to the total intensity of the reference beam, regardless of the beam position on the y-axis. This allows constant tracking of the reference beam along the x-axis of the BPD 22 even if the beam deviates from the midline. Such tracking is necessary for synchronization of data modulation and intensity adjustments with the exposure beam position along a row.

In the E1-Op subsystem, the amplifier circuit receives the voltage signals from the two sensors of the BPD and sums them. The resulting voltage, proportional to the beam intensity, is then converted to a clock (CLK) pulse. A voltage signal is generated every 288 microns. Thus, a CLK pulse frequency with a pulse width of 288 microns is provided.

A Strobe PLL board multiplies the CLK frequency into a pulse train of EXP CLK signals. Each EXP CLK signal is sent to a Data subsystem (not shown) and to a Beam Control board (not shown). Each EXP CLK signal instructs the Data subsystem to send data for one exposure point to the Beam Control board.

The Beam Control board executes data modulation and contains an LUT that stores the intensity values along a scan line. The beam position detector pulses advance the LUT addresses so that the proper laser intensity is applied along the entire line.

In summary, the optical components that lie in the optical path of the laser beam are responsible for directing the path of a modulated exposure beam of correct intensity to the film. These components are controlled by the E1-Op subsystem, which adjusts the beam position, modulates the beam and adjusts the beam intensity.

The apparatus of FIGS. 1A and 1B, including the E1-Op subsystem, the Data subsystem, the Strobe PLL Beam and the Beam Control board, except to the extent that it includes the apparatus of FIGS. 2–5B, is known, and accordingly available from, Scitex Computers of Herzlia, Israel as the "Ray Star Color Image Setter."

It will be appreciated by persons skilled in the art that the present invention is not limited by what has been particularly shown and described hereinabove. Rather the scope of the present invention is defined only by the claims which follow:

We claim:

1. A laser beam scanner comprising:
    a laser source;
    means for producing a scanning beam and a reference beam which are generally parallel;
    means for directing the scanning beam onto a surface to be scanned;
    means for receiving light reflected from the surface to be scanned and comprising a light guide arranged in light receiving relationship with the surface to be scanned alongside the scan line at one side thereof and a cylindrical mirror arranged in light receiving relationship with the surface to be scanned alongside the scan line at an opposite side thereof for reflecting light received from the surface into the light guide said light guide comprising a generally planar portion having a concave curved edge facing the scan line, said generally planar portion terminating in a generally circular cylindrical light pipe having axial butt ends; and
    photodetectors associated in light receiving relationship with said axial butt ends.

2. Apparatus as in claim 1, wherein the light guide is made of fluorescent materials as to optimize light collection efficiency.

3. Apparatus according to claim 1 wherein said generally planar portion is disposed at an angle of approximately 45 degrees from the plane of the surface to be scanned.

4. Apparatus according to claim 1 wherein said concave curved edge is disposed at a distance of about 0.15 inches form the scan line.

5. Apparatus according to claim 1 wherein said generally planar portion is arranged with respect to said light pipe so as to define therewith a cross section having the general shape of a "P".

6. Apparatus for receiving light reflected from a surface to be scanned and comprising a light guide arranged in light receiving relationship with the surface to be scanned alongside the scan line at one side thereof and a cylindrical mirror arranged in light receiving relationship with the surface to be scanned alongside the scan line at an opposite side thereof for reflecting light received from the surface into the light guide, said light guide comprising a generally planar portion having a concave curved edge facing the scan line, said generally planar portion terminating in a generally circular cylindrical light pipe having axial butt ends, and photodetectors associated in light receiving relationship with said axial butt ends.

7. Apparatus as in claim 6, wherein the light guide is made of fluorescent materials as to optimize light collection efficiency.

8. Apparatus according to claim 6 wherein said generally planar portion is disposed at an angle of approximately 45 degrees from the plane of the surface to be scanned.

9. Apparatus according to claim 6 wherein said concave curved edge is disposed at a distance of about 0.15 inches from the scan line.

10. Apparatus according to claim 6 wherein said generally planar portion is arranged with respect to said light pipe so as to define therewith a cross section having the general shape of a "P".

* * * * *